United States Patent
Choi et al.

(10) Patent No.: US 10,635,322 B2
(45) Date of Patent: Apr. 28, 2020

(54) STORAGE DEVICE, COMPUTING DEVICE INCLUDING THE SAME, AND OPERATION METHOD OF THE COMPUTING DEVICE

(71) Applicant: SAMSUNG ELECTRONICS CO., LTD., Suwon-si (KR)

(72) Inventors: Chang-eun Choi, Yongin-si (KR); Su Hwa Yoo, Yongin-si (KR); Hwaseok Oh, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/297,802

(22) Filed: Mar. 11, 2019

(65) Prior Publication Data

US 2019/0205036 A1 Jul. 4, 2019

Related U.S. Application Data

(62) Division of application No. 15/813,787, filed on Nov. 15, 2017, now Pat. No. 10,254,974.

(60) Provisional application No. 62/422,148, filed on Nov. 15, 2016.

(30) Foreign Application Priority Data

Nov. 2, 2017 (KR) .................. 10-2017-0145543

(51) Int. Cl.
*H04B 1/38* (2015.01)
*H04L 5/16* (2006.01)
*G06F 3/06* (2006.01)
*G06F 16/13* (2019.01)
*G06F 13/38* (2006.01)

(Continued)

(52) U.S. Cl.
CPC .......... *G06F 3/0611* (2013.01); *G06F 3/0604* (2013.01); *G06F 3/0635* (2013.01); *G06F 3/0659* (2013.01); *G06F 3/0679* (2013.01); *G06F 13/38* (2013.01); *G06F 13/4022* (2013.01); *G06F 16/13* (2019.01); *G05B 15/02* (2013.01)

(58) Field of Classification Search
CPC ............. G06F 3/0611; G06F 17/30091; G06F 3/0604; G06F 3/0679; G06F 3/0635; G06F 3/0659; G06F 13/161; G06F 13/4239; G06F 16/13; G06F 13/38; G06F 13/4022; G06F 3/0616; G05B 15/02
USPC ....................................... 375/219, 220, 222
See application file for complete search history.

(56) References Cited

U.S. PATENT DOCUMENTS

| | | |
|---|---|---|
| 5,890,005 A | 3/1999 | Lindholm |
| 6,405,278 B1 | 6/2002 | Liepe |
| 7,502,628 B2 | 3/2009 | Imaeda |

(Continued)

FOREIGN PATENT DOCUMENTS

| | | |
|---|---|---|
| KR | 10-2012-0035089 A | 4/2012 |
| KR | 10-1579785 B1 | 12/2015 |

*Primary Examiner* — Phuong Phu
(74) *Attorney, Agent, or Firm* — Sughrue Mion, PLLC

(57) ABSTRACT

A computing device and a method of operating the same are provided. The computing device includes a modem that communicates with an external device, a storage device, an application processor that accesses the storage device, and a switch that selectively provides one of a first communication path connecting the modem and the application processor and a second communication path connecting the modem and the storage device without passing through the application processor.

19 Claims, 15 Drawing Sheets

(51) Int. Cl.
*G06F 13/40* (2006.01)
*G05B 15/02* (2006.01)

(56) References Cited

U.S. PATENT DOCUMENTS

| | | |
|---|---|---|
| 7,743,213 B2 | 6/2010 | Hong |
| 7,917,673 B2 | 3/2011 | Suh |
| 9,959,058 B1 * | 5/2018 | O'Brien ................ G06F 3/0616 |
| 2003/0140202 A1 | 7/2003 | LaBerge |
| 2004/0204093 A1 | 10/2004 | Imaeda |
| 2005/0066067 A1 | 3/2005 | Suh |
| 2008/0126681 A1 | 5/2008 | Hong |
| 2013/0097228 A1 | 4/2013 | Ejiri |
| 2013/0159491 A1 | 6/2013 | Hara |

* cited by examiner

STORAGE DEVICE, COMPUTING DEVICE INCLUDING THE SAME, AND OPERATION METHOD OF THE COMPUTING DEVICE

CROSS-REFERENCE TO RELATED APPLICATIONS

This is a divisional application of U.S. application Ser. No. 15/813,787, filed Nov. 15, 2017, which claims priority from U.S. provisional patent application No. 62/422,148, filed on Nov. 15, 2016, and claims priority from Korean Patent Application No. 10-2017-0145543, filed on Nov. 2, 2017 in the Korean Intellectual Property Office, the entire contents of which are hereby incorporated by reference.

BACKGROUND

Apparatuses and methods consistent with one or more exemplary embodiments relate to an electronic device, and more particularly, to a storage device, a computing device including the storage device, and an operation method of the computing device.

A data transfer rate of a network is increasing as network technologies develop. The increase in the data transfer rate of the network may allow an increasing amount and a variety of different types of data to be transmitted over the network. Generally, data is transmitted over the network by using a modulator-demodulator (MODEM).

A transmitting terminal may modulate and transmit data through a modem. A receiving terminal may receive and demodulate data through a modem. In the receiving terminal, the received and demodulated data may be transmitted to a processor. The processor may store the received data in a memory or a storage device.

As the types and the amount of data to be transmitted over the network increase, the number of times that the receiving terminal receives data through the modem may increase. As the number of times that the receiving terminal receives data through the modem increases, the number of times that the processor of the receiving terminal is occupied by network communication may increase.

SUMMARY

Aspects of one or more exemplary embodiments provide a computing device, a storage device, and an operation method of the computing device, capable of preventing a processor from being occupied due to communication over a network or reducing the occupation of the processor.

According to an aspect of an exemplary embodiment, there is provided a computing device including: a modem configured to communicate with an external device; a storage device; an application processor configured to access the storage device; and a switch configured to selectively provide one of a first communication path connecting the modem and the application processor and a second communication path connecting the modem and the storage device without passing through the application processor.

The switch may selectively provide one of the first communication path and the second communication path based on whether a request or data received from the external device through the modem indicates the application processor or the storage device.

The switch may include: a modem interface configured to communicate with the modem; a processor interface configured to communicate with the application processor; a storage interface configured to communicate with the storage device; and a router configured to selectively provide a request or data received through the modem interface to one of the processor interface and the storage interface.

At least one of the processor interface and the storage interface may be different from the modem interface.

A request or data received from the external device through the modem may include an address corresponding to one of the application processor and the storage device.

Requests or data received from the external device through the modem may include a same address and different tags respectively corresponding to the application processor and the storage device.

The computing device may further include a power manager, wherein the application processor may be included in a first power domain, and the modem, the switch, and the storage device may be included in a second power domain, and wherein the power manager may be configured to control sleep modes and active modes of the first power domain and the second power domain independently of each other.

The computing device may further include a power manager, wherein the application processor may be included in a first power domain, the modem and the switch may be included in a second power domain, and the storage device may be included in a third power domain, and wherein the power manager may be configured to control sleep modes and active modes of the first power domain, the second power domain, and the third power domain independently of each other.

Based on a request or data received from the external device through the modem corresponding to the storage device, the power manager may be configured to allow the switch and the storage device to be in an active state.

The switch may be within the application processor, and the switch may provide the first communication path between the modem and a core of the application processor and may provide the second communication path between the modem and the storage device without passing through the core of the application processor.

The switch and the modem may be within the application processor, and the switch may provide the first communication path between the modem and a core of the application processor and may provide the second communication path between the modem and the storage device without passing through the core of the application processor.

The switch may be within the modem.

The storage device may include: a first storage area accessed based on a first request received from the application processor; and a second storage area accessed based on a second request received through the modem and corresponding the storage device, and wherein the storage device may drive a file system that accesses the second storage area based on the second request.

According to an aspect of another exemplary embodiment, there is provided a computing device including: a nonvolatile memory including a first storage area and a second storage area; and a controller configured to receive a first request and a second request from a first external device and a second external device, respectively, to access the first storage area based on the first request, and to access the second storage area based on the second request, wherein the controller includes: a file system configured to manage the second storage area based on the second request, and a flash translation layer configured to translate the second request to a command associated with the second storage area by using the file system.

The controller may further include: a first link layer associated with the first external device and the first storage area; and a second link layer associated with the second external device and the second storage area, and wherein the first link layer may be different from the second link layer.

The controller may further include: a first physical layer associated with the first external device and the first storage area; and a second physical layer associated with the second external device and the second storage area, and wherein the first physical layer may be different from the second physical layer.

The flash translation layer may be configured to translate the first request to a second command associated with the first storage area.

The controller may further include a second flash translation layer configured to translate the first request to a second command associated with the first storage area.

The controller may be configured to adjust a ratio of the first storage area and the second storage area based on a request from an application processor.

According to an aspect of another exemplary embodiment, there is provided an operation method of a computing device which includes a storage device, a modem, and an application processor, the method including: receiving, at the modem, a first request or data from an external device; based on the first request or data corresponding to the application processor, providing, by a switch, a first communication path such that the first request or data is provided from the modem to the application processor; based on the first request or data corresponding to the storage device, providing, by the switch, a second communication path such that the first request or data is provided from the modem to the storage device without passing through the application processor; and providing, from the application processor, a second request or data to the storage device through a third communication path without passing through the switch.

The received first request may include an address corresponding to one of the application processor and the storage device.

Requests or data received from the external device through the modem may include a same address and different tags respectively corresponding to the application processor and the storage device.

The application processor may be included in a first power domain, and the modem, the switch, and the storage device may be included in a second power domain; and the operation method may further include controlling sleep modes and active modes of the first power domain and the second power domain independently of each other.

The application processor may be included in a first power domain, the modem and the switch may be included in a second power domain, and the storage device may be included in a third power domain; and the operation method may further include controlling sleep modes and active modes of the first power domain, the second power domain, and the third power domain independently of each other.

According to an aspect of another exemplary embodiment, there is provided a switch for a computing device, the switch including: a modem interface configured to communicate with a modem; a processor interface configured to communicate with a processor; a storage interface configured to communicate with a storage device; and a router configured to selectively provide a request or data received through the modem interface to one of: the processor interface along a first communication path connecting the modem and the processor, and the storage interface over a second communication path connecting the modem and the storage device without passing through the processor.

At least one of the processor interface and the storage interface may be different from the modem interface.

The request or data received through the modem interface may include an address corresponding to one of the processor and the storage device.

Requests or data received through the modem interface may include a same address and different tags respectively corresponding to the processor and the storage device.

BRIEF DESCRIPTION OF THE FIGURES

The above and/or other objects and features will become apparent from the following description with reference to the following figures, wherein like reference numerals refer to like parts throughout the various figures unless otherwise specified, and wherein.

DETAILED DESCRIPTION

Below, exemplary embodiments will be described in detail and clearly to such an extent that one of ordinary skill in the art can implement an inventive concept without undue burden or experimentation. Further, it is understood that expressions such as "at least one of," when preceding a list of elements, modify the entire list of elements and do not modify the individual elements of the list.

Figure 1:
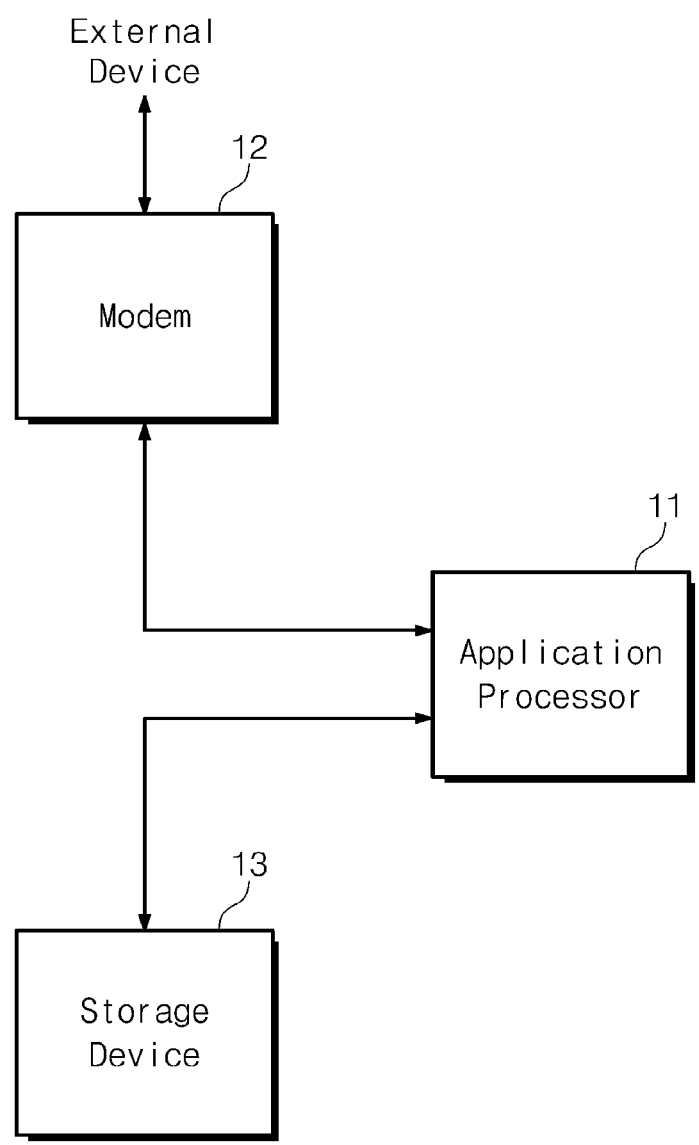
FIG. 1 is a block diagram illustrating an example of a computing device.

FIG. 1 is a block diagram illustrating an example of a computing device 10. Referring to FIG. 1, the computing device 10 may include a mobile device such as a smartphone, a smart pad, or a smart watch. Referring to FIG. 1, the computing device 10 includes an application processor 11, a modem 12, and a storage device 13.

The application processor 11 may drive an operating system of the computing device 10 and may execute various applications. The modem 12 may communicate with an external device. For example, the modem 12 may communicate with an external device in a wired or wireless manner. Additionally, the modem 12 may modulate data for transmission to the external device, and may demodulate data received from the external device. The storage device 13 may store data, such as data that the computing device 10 intends to store in a nonvolatile manner or for a long time.

Generally, various requests transmitted from an external device to the modem 12 may be provided to the application processor 11. If a request received through the modem 12 is a request to access the storage device 13, the application processor 11 may access the storage device 13 depending on the received request.

When the external device intends to store data in the storage device 13 or read data from the storage device 13, a request(s) that the external device transmits may be provided to the storage device 13 through the modem 12 and the application processor 11. That is, the external device may access the storage device 13 through the application processor 11.

Under this condition, if the external device frequently accesses the storage device 13, many resources of the application processor may be occupied or used by handling the requests from the external device. That is, available resources of the application processor 11 may decrease, a load on the application processor 11 may increase, and thus, power consumption of the application processor 11 may increase. As a result, overall processes of the application processor 11 may be slower, and a battery life of the computing device 10 may be reduced.

Figure 2:
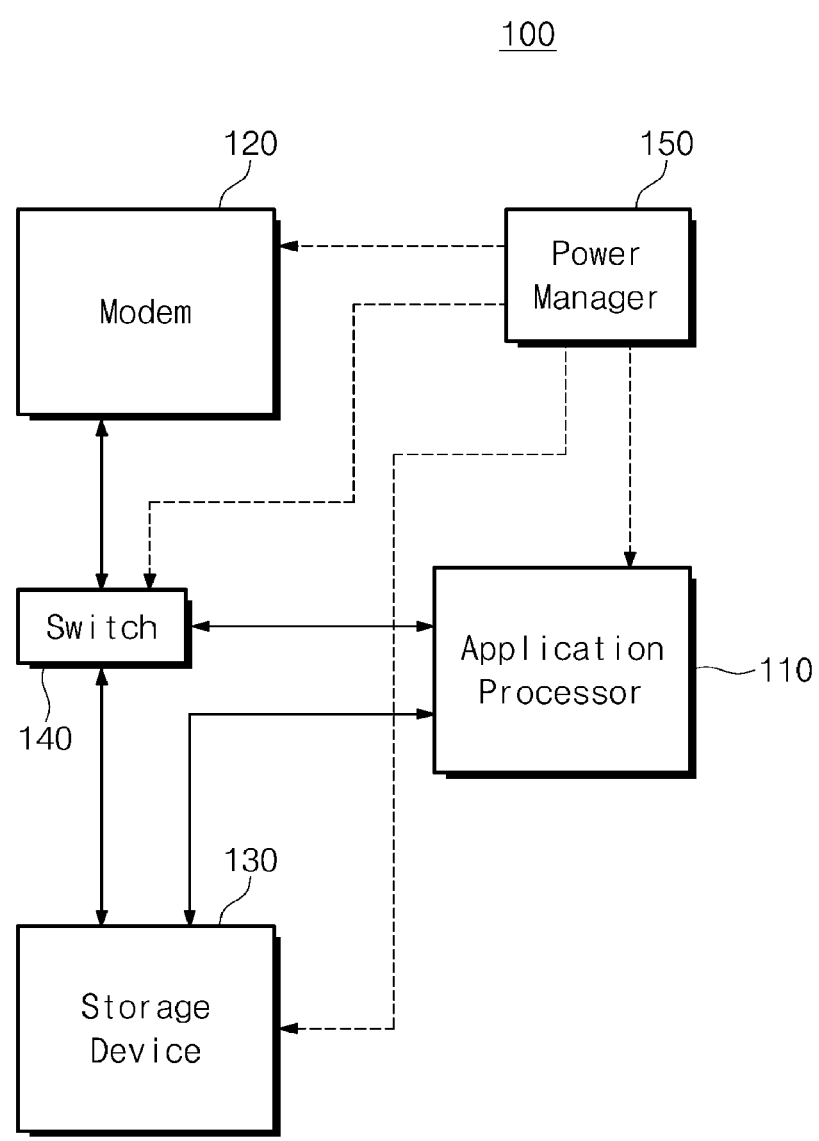
FIG. 2 is a block diagram illustrating a computing device according to an exemplary embodiment.

FIG. 2 is a block diagram illustrating a computing device 100 according to an exemplary embodiment. By way of example, the computing device 100 may include a mobile device such as a smartphone, a smart pad, or a smart watch, although one or more exemplary embodiments are not limited thereto. For example, one or more other exemplary embodiments may be directed to any computing device 10 including a processor, a modem, and a storage device. Referring to FIG. 2, the computing device 100 of the present exemplary embodiment includes an application processor 110, a modem 120, a storage device 130, a switch 140, and a power manager 150.

The application processor 110 may drive an operating system of the computing device 100 and may execute various applications. The application processor 110 may communicate with the modem 120 through the switch 140. The application processor 110 may directly access the storage device 130.

The modem 120 may communicate with an external device. For example, the modem 120 may communicate with the external device through wireless communications such as long term evolution (LTE), global system for mobile communications (GSM), wireless fidelity (Wi-Fi), near field communication (NFC), Bluetooth, etc.

As another example, the modem 120 may communicate with the external device through wired communications such as Ethernet, data-over-cable service interface specifications (DOCSIS), etc. For example, the modem 120 may be connected to a network through wireless communications or wired communications, thus communicating with the external device. Additionally, the modem 12 may modulate data for transmission to the external device, and may demodulate data received from the external device.

The storage device 130 may store data, e.g., data that the computing device 100 intends to store in a nonvolatile manner or for a long time. The storage device 130 may include a nonvolatile memory such as a flash memory, a phase change memory, a ferroelectric memory, a magnetic memory, a resistive memory, etc.

The switch 140 is connected to the application processor 110, the modem 120, and the storage device 130. The switch 140 may transmit a request (or data) from the modem 120 to the application processor 110 or the storage device 130. For example, the switch 140 may distinguish a destination of the received request (or data) between the application processor 110 and the storage device 130, based on the request (or data) received via the modem 120.

When the destination of the received request corresponds to the application processor 110, the switch 140 may provide the received request (or data) to the application processor 110. When the destination of the received request corresponds to the storage device 130, the switch 140 may provide the received request (or data) to the storage device 130 without passing through the application processor 110.

If a request (or data) is received from the application processor 110, the switch 140 may provide the received request (or data) to the modem 120. If a request (or data) is received from the storage device 130, the switch 140 may provide the received request (or data) to the modem 120.

That is, the switch 140 may select between or provide one of a first communication path to connect the modem 120 and the application processor 110 and a second communication path to connect the modem 120 and the storage device 130, depending on a request (or data) received from the modem 120, the application processor 110, or the storage device 130. When the received request indicates the storage device 130, the received request is directly provided to the storage device 130 without passing through the application processor 110. As a result, resource usage and power consumption of the application processor 110 decrease.

The power manager 150 may supply power or control a supply of power to the application processor 110, the modem 120, the storage device 130, and the switch 140. Dotted lines denote paths through which the power manager 150 supplies power. The power manager 150 may control sleep and active modes of at least one of the application processor 110, the modem 120, the storage device 130, and the switch 140.

The power manager 150 may construct, manage, and/or implement power domains with different combinations of components. For example, a first power domain may include the application processor 110 and a second power domain may include the modem 120, the storage device 130, and the switch 140. The power manager 150 may control sleep modes and active modes of the first and second power domains independently.

For example, when the application processor 110 in the first power domain is controlled to enter the sleep mode, the modem 120, the storage device 130, and the switch 140 in the second power domain may be controlled to enter (or stay in) the active mode. The modem 120 of the active mode may receive a request from an external device. The switch 140 of the active mode may then receive the request from the modem 120.

If a request received through the modem 120 indicates the storage device 130, the modem 120 may transmit the received request to the storage device 130 in the active mode. That is, if the sleep modes and power saving modes of power domains are controlled independently, even though the application processor 110 is in the sleep mode, the switch 140 may provide a request, which targets the storage device 130 and is received from the modem 120, to the storage device 130.

As another example, the power manager 150 may construct, manage, and/or implement power domains such that a first power domain includes the application processor 110, a second power domain includes the modem 120 and the switch 140, and a third power domain includes the storage device 130. The power manager 150 may control sleep modes and active modes of the first to third power domains independently.

For example, when the application processor 110 in the first power domain and the storage device 130 in the third power domain are controlled to enter the sleep mode, the modem 120 and the switch 140, which belong to the second power domain, may be controlled to enter (or stay in) the active mode. The modem 120 in the active mode may receive a request from an external device. The switch 140 of the active mode may then receive the request from the modem 120.

If a request received through the modem 120 indicates the storage device 130, the switch 140 may request the power manager 150 or the storage device 130 to allow the storage device 130 to enter the active mode. If the storage device 130 is controlled to enter the active mode, the switch 140 may provide the received request to the storage device 130 in the active mode.

That is, if the sleep modes and the power saving modes of power domains are controlled independently, even though the application processor 110 is in the sleep mode and the storage device 130 is in the sleep mode, the switch 140 may provide a request, which targets the storage device 130 and is received from the modem 120, to the storage device 130.

In an exemplary embodiment, power domains may be constructed such that the modem 120 and the switch 140 belong to different power domains. When the modem 120 receives a request and the switch 140 is in the sleep mode, the modem 120 may request the switch 140 or the power manager 150 to allow the switch 140 to enter the active mode. If the switch 140 is controlled to enter the active mode, the modem 120 may provide the received request to the switch 140.

In an exemplary embodiment, the application processor 110, the modem 120, the storage device 130, the switch 140, and the power manager 150 may be implemented with independent hardware. In an exemplary embodiment, the application processor 110, the modem 120, the storage device 130, the switch 140, and the power manager 150 may be implemented with independent semiconductor chips or independent semiconductor packages. According to another exemplary embodiment, any combination of the aforementioned components may be combined, e.g., in a combined or same hardware.

Figure 3:
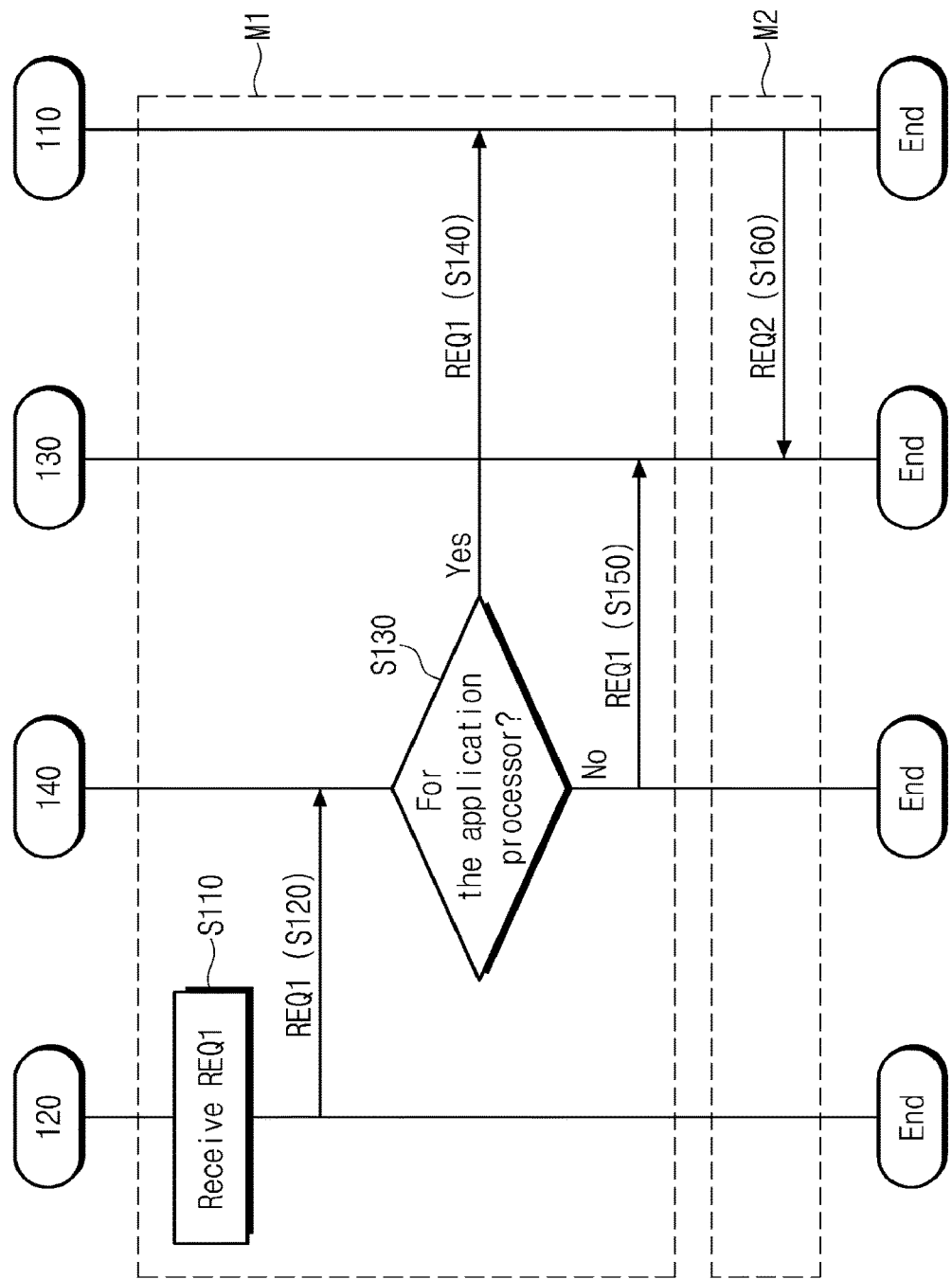
FIG. 3 is a flowchart illustrating methods of accessing a storage device according to one or more exemplary embodiments.

FIG. 3 is a flowchart illustrating methods of accessing a storage device 130 according to one or more exemplary embodiments. Referring to FIGS. 2 and 3, in operation S110, the modem 120 may receive a first request REQ1 from an external device. In operation S120, the modem 120 may provide the first request REQ1 to the switch 140.

In operation S130, the switch 140 may determine whether the first request REQ1 is associated with the application processor 110. If it is determined that the first request REQ1 is associated with (e.g., destined for) the application processor 110, in operation S140, the switch 140 may provide the first request REQ1 to the application processor 110.

If it is determined that the first request REQ1 is not associated with the application processor 110, e.g., if it is determined that the first request REQ1 is associated with the storage device 130, in operation S150, the switch 140 may provide the first request REQ1 to the storage device 130. Operation S110 to operation S150 may constitute a first method M1 of accessing the storage device 130.

In operation S160, the application processor 110 may provide a second request REQ2 to the storage device 130. For example, the application processor 110 may generate the second request REQ2 in response to a request of a driven operating system or application. As another example, the application processor 110 may generate the second request REQ2 in response to a request (e.g., REQ1 received in operation S140) received through the modem 120. Operation S160 may form a second method M2 of accessing the storage device 130.

According to the first method M1, the storage device 130 may be accessed by the first request REQ1 received through the switch 140 from the modem 120 without passing through the application processor 110. According to the second method M2, the storage device 130 may be accessed by the second request REQ2 directly received from the application processor 110 without passing through the switch 140.

Figure 4:
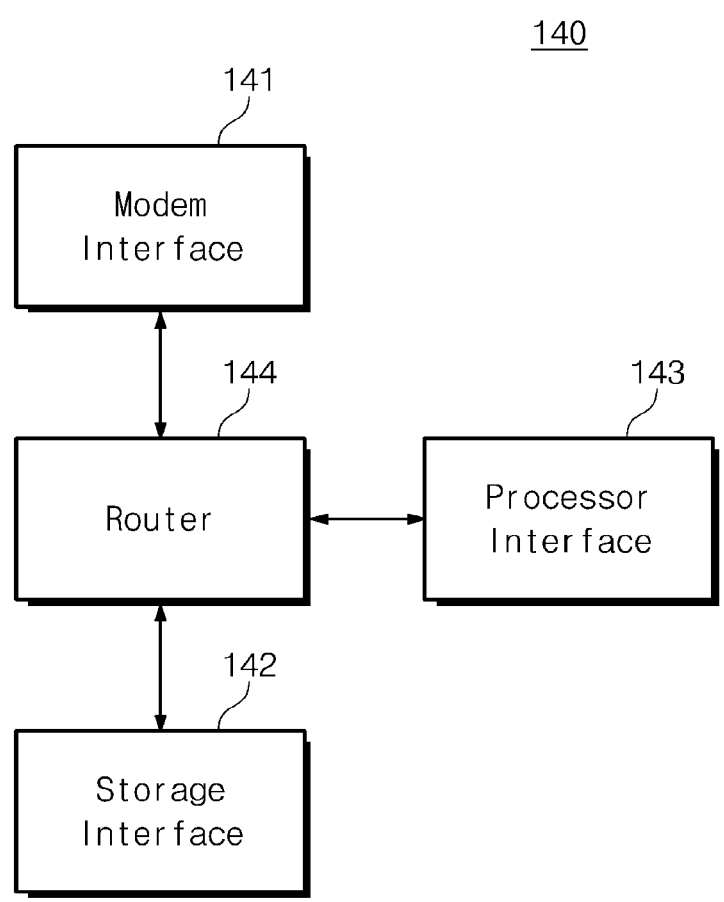
FIG. 4 is a block diagram illustrating a switch according to an exemplary embodiment.

FIG. 4 is a block diagram illustrating a switch 140 according to an exemplary embodiment. Referring to FIGS. 2 and 4, the switch 140 includes a modem interface 141, a storage interface 142, a processor interface 143, and a router 144.

The modem interface 141 may communicate with the modem 120. For example, the modem interface 141 may have a mobile industry processor interface (MIPI) M-PHY physical layer and an MIPI low latency interface (LLI) link layer. As another example, the modem interface 141 may have a peripheral component interconnect (PCI) or PCI express (PCIe) physical layer and a link layer.

The storage interface 142 may communicate with the storage device 130. For example, the storage interface 142 may have the MIPI M-PHY physical layer and the MIPI LLI link layer. As another example, the storage interface 142 may have the PCI or PCIe physical layer and a link layer. As another example, the storage interface 142 may have the MIPI M-PHY physical layer and the MIPI UniPro link layer.

For example, the storage interface 142 may be the same as the modem interface 141. That is, the switch 140 may provide a second communication path between the modem 120 and the storage device 130, without interface or protocol translation. As another example, the storage interface 142 may be different from the modem interface 141. That is, the switch 140 may provide the second communication path between the modem 120 and the storage device 130, with interface or protocol translation.

The processor interface 143 may communicate with the application processor 110. For example, the processor interface 143 may have the MIPI M-PHY physical layer and the MIPI LLI link layer. As another example, the processor interface 143 may have the PCI or PCIe physical layer and the link layer. As another example, the processor interface 143 may have the MIPI M-PHY physical layer and an MIPI UniPro link layer.

For example, the processor interface 143 may be the same as the modem interface 141. That is, the switch 140 may provide a first communication path between the modem 120 and the application processor 110, without interface or protocol translation. As another example, the processor interface 143 may be different from the modem interface 141. That is, the switch 140 may provide the first communication path between the modem 120 and the application processor 110, with interface or protocol translation.

The router 144 may receive a request from the modem 120 through the modem interface 141. The router 144 may determine whether the received request is associated with (e.g., destined for) the application processor 110 or is associated with the storage device 130. If it is determined that the received request is associated with the application processor 110, the router 144 may provide the received request to the application processor 110 through the processor interface 143.

If it is determined that the received request is associated with the storage device 130, the router 144 may provide the received request to the storage device 130 through the storage interface 142. In an exemplary embodiment, if the storage device 130 is in the sleep mode, the router 144 may request the storage device 130 or the power manager 150 to allow the storage device 130 to enter the active mode. Afterwards, the router 144 may provide the received request to the storage device 130.

Figure 5A:
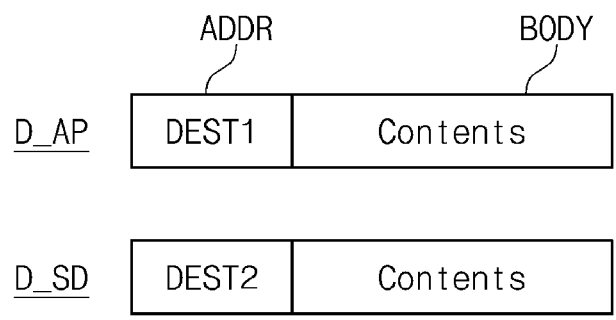
FIG. 5A illustrates an example of requests received from an external device through a modem according to an exemplary embodiment.

FIG. 5A illustrates an example of requests received from an external device through the modem 120, according to an exemplary embodiment. Referring to FIGS. 2 and 5A, requests that the modem 120 receives may include a processor request D_AP and a storage request D_SD. The processor request D_AP may refer to a request associated with the application processor 110, and the storage request D_SD may refer to a request associated with the storage device 130.

Each of the processor request D_AP and the storage request D_SD includes an address ADDR and a body BODY. The address ADDR of the processor request D_AP may be different from the address ADDR of the storage request D_SD. For example, the address ADDR of the processor request D_AP may indicate a first destination DEST1, and the first destination DEST1 may correspond to the application processor 110.

The address ADDR of the storage request D_SD may indicate a second destination DEST2, and the second destination DEST2 may correspond to the storage device 130. That is, the processor request D_AP and the storage request D_SD received in the modem 120 may have different addresses. For example, the address ADDR may be divided into first and second portions.

The first portion of the address ADDR of the processor request D_AP may be different from or the same as the first portion of the address ADDR of the storage request D_SD. For example, the first portion may indicate the computing device 100. The second portion of the address ADDR of the processor request D_AP may be different from the second portion of the address ADDR of the storage request D_SD. For example, the second portion of the address ADDR of the processor request D_AP and the second portion of the address ADDR of the storage request D_SD may indicate the application processor 110 and the storage device 130, respectively. The body BODY may include contents of the processor request D_AP or the storage request D_SD.

Figure 5B:
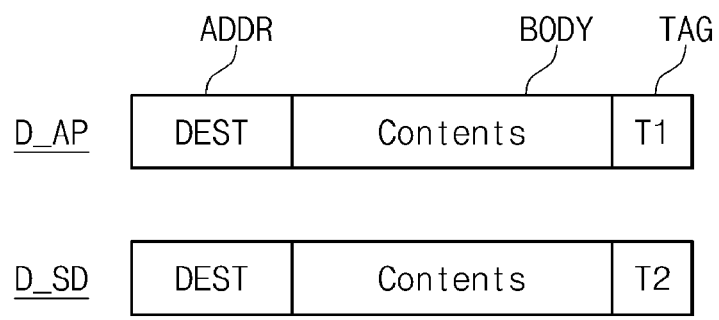
FIG. 5B illustrates an example of requests received from the external device through the modem according to another exemplary embodiment.

FIG. 5B illustrates an example of requests received from an external device through the modem 120, according to another exemplary embodiment. Referring to FIGS. 2 and 5B, requests that the modem 120 receives may include a processor request D_AP and a storage request D_SD. The processor request D_AP may refer to a request associated with the application processor 110, and the storage request D_SD may refer to a request associated with the storage device 130.

Each of the processor request D_AP and the storage request D_SD includes an address ADDR and a body BODY. The address ADDR of the processor request D_AP may be different from or the same as the address ADDR of the storage request D_SD. For example, the addresses ADDR of the processor request D_AP and the storage request D_SD may indicate the same destination DEST. The destination DEST may correspond to the computing device 100.

Each of the processor request D_AP and the storage request D_SD may further include a tag TAG. The tag TAG of the processor request D_AP may be different from the tag TAG of the storage request D_SD. The tag TAG of the processor request D_AP that is a first tag T1 may indicate the application processor 110. The tag TAG of the storage request D_SD that is a second tag T2 may indicate the storage device 130.

That is, the processor request D_AP and the storage request D_SD may use the same address, but whether a requested destination is associated with the application processor 110 or the storage device 130 may be determined by using tags. The body BODY may include contents of the processor request D_AP or the storage request D_SD.

Figure 6:
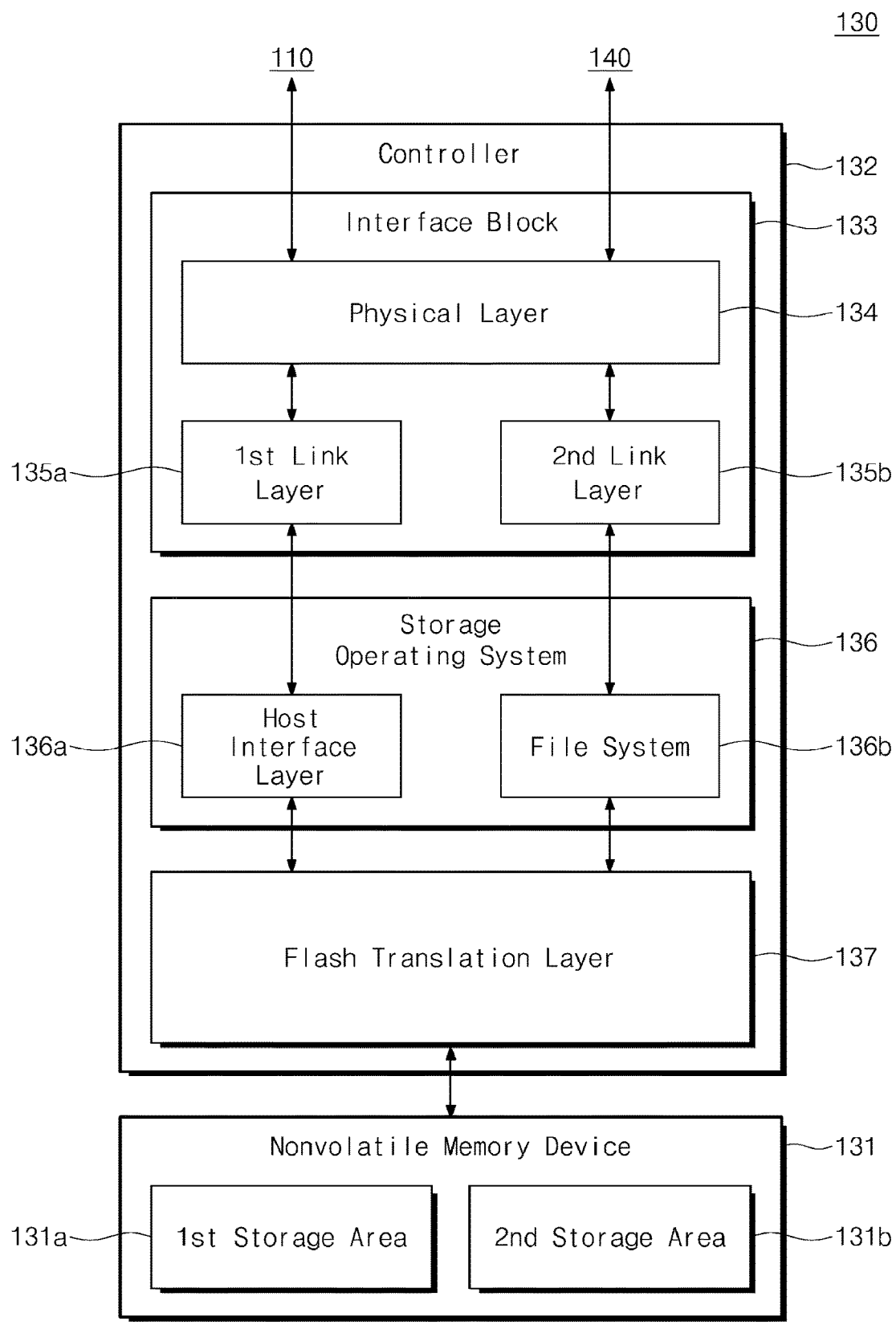
FIG. 6 is a block diagram illustrating a storage device according to an exemplary embodiment.

FIG. 6 is a block diagram illustrating a storage device 130 according to an exemplary embodiment. Referring to FIGS. 2 and 6, the storage device 130 includes a nonvolatile memory device 131 and a controller 132. The nonvolatile memory device 131 may include a first storage area 131a and a second storage area 131b.

The first storage area 131a may be allocated to the application processor 110. Data that the application processor 110 writes in the storage device 130 may be stored in the first storage area 131a. The application processor 110 may read data stored in the first storage area 131a of the storage device 130.

The second storage area 131b may be allocated to the modem 120. Data to be written in the storage device 130 through the switch 140 from the modem 120 may be stored in the second storage area 131b. Data stored in the second storage area 131b may be transmitted to an external device through the switch 140 and the modem 120.

The first storage area 131a may be managed by a file system driven in the application processor 110. The application processor 110 may direct the storage device 130 to perform a write, a read, or an erase operation on the first storage area 131a based on the file system.

A ratio of the first storage area 131a to the second storage area 131b may be adjusted by the controller 132. For example, in the case where a free space of the first storage area 131a is insufficient, the controller 132 may decrease the capacity of the second storage area 131b and may increase the capacity of the first storage area 131a. If a free space of the second storage area 131b is insufficient, the controller 132 may decrease the capacity of the first storage area 131a and may increase the capacity of the second storage area 131b.

The controller 132 includes an interface block 133, a storage operating system 136, and a flash translation layer 137. The interface block 133 may communicate with the switch 140 or the application processor 110. For example, the interface block 133 may receive a first request from the switch 140 or may receive a second request from the application processor 110.

The interface block 133 includes a physical layer 134, a first link layer 135a, and a second link layer 135b. The physical layer 134 may correspond in common to the switch 140 and the application processor 110. The physical layer 134 may alternately communicate with the switch 140 and the application processor 110.

For example, the application processor 110 does not (e.g., fails to) communicate with the physical layer 134 while the physical layer 134 communicates with the switch 140. Additionally, the switch 140 does not communicate with the physical layer 134 while the physical layer 134 communicates with the application processor 110. The physical layer 134 may include MIPI M-PHY.

The physical layer 134 may give or assign priorities to communication with the switch 140 and communication with the application processor 110. For example, the physical layer 134 may process communication with the application processor 110 prior to communication with the switch 140. When the physical layer 134 communicates with the application processor 110, the physical layer 134 may ignore a communication request of the switch 140 or may provide a busy signal to the switch 140 to wait for communication.

A first link layer 135a may correspond to the application processor 110. The physical layer 134 may provide a request (or data) received from the application processor 110 to the first link layer 135a. The physical layer 134 may provide a request (or data) received from the first link layer 135a to the application processor 110.

A second link layer 135b may correspond to the switch 140. The physical layer 134 may provide a request (or data) received from the switch 140 to the second link layer 135b. The physical layer 134 may provide a request (or data) received from the second link layer 135b to the switch 140.

For example, the physical layer 134 may include MIPI M-PHY. The first link layer 135a may include MIPI UniPro. The second link layer 135b may include MIPI LLI. Since a physical layer for storage and a physical layer for modem are implemented with M-PHY, the physical layer 134 may be shared by the switch 140 and the application processor 110.

In an exemplary embodiment, as in the description provided above with reference to FIGS. 5A and 5B, a request originating from the modem 120 and a request originating from the application processor 110 may have different addresses or different tags. Depending on the different addresses or the different tags, the physical layer 134 may provide the request originating from the application processor 110 to the first link layer 135a and may provide the request originating from the modem 120 to the second link layer 135b.

The storage operating system 136 may control operations of the storage device 130. The storage operating system 136 may include a host interface layer 136a and a file system 136b. The host interface layer 136a may translate a request (or data) received from the interface block 133 to a form suitable for the storage operating system 136 and may provide the translated request (or data) to the storage operating system 136.

The host interface layer 136a may translate a request (or data), which the storage operating system 136 intends to output through the interface block 133, to a form suitable for the interface block 133 and may provide the translated request (or data) to the interface block 133. The storage operating system 136 may generate a command (e.g., a read, write, or erase command) depending on the translated request (or data) and may provide the generated command to the flash translation layer 137.

In particular, the host interface layer 136a may correspond to communication with the application processor 110. The host interface layer 136a may include a universal flash storage (UFS) host interface layer (HIL). That is, the storage device 130 may perform UFS-based communication with the application processor 110 depending on MIPI M-PHY of the physical layer 134, MIPI UniPro of the first link layer 135a, and UFS HIL of the host interface layer 136a.

The file system 136b may correspond to communication with the modem 120. As illustrated in FIG. 2, a request (or data) received through the modem 120 is provided to the storage device 130 without passing through the application processor 110. That is, the request (or data) provided from the modem 120 to the storage device 130 may not be managed by a file system of the application processor 110.

To manage the request (or data) provided from the modem 120 to the storage device 130, that is, to manage the second storage area 131b, the file system 136b may be provided in the storage operating system 136. The file system 136b may include a network file system (NFS) or a common Internet file system (CIFS). The file system 136b may be distinguished from the file system of the application processor 110.

The storage operating system 136 may allocate addresses (e.g., logical addresses) to the second storage area 131b based on the file system 136b. The storage operating system 136 may generate a write, read, or erase command associated with the second storage area 131b based on the file system 136b. The storage operating system 136 may provide the generated command to the flash translation layer 137.

The storage operating system 136 may provide information associated with the file system 136b to an external device through the switch 140 and the modem 120. The storage operating system 136 may provide the information to allow the external device to access the second storage area 131b.

The flash translation layer 137 may translate a command provided from the storage operating system 136 so as to be suitable for the nonvolatile memory device 131. For example, the flash translation layer 137 may translate a first address (e.g., a logical address) of a command provided from the storage operating system 136 to a second address (e.g., a physical address of the nonvolatile memory device 131) suitable for the nonvolatile memory device 131.

The flash translation layer 137 may provide a command having an address (e.g., a physical address) of the first storage area 131a to the nonvolatile memory device 131 depending on a request originating from the application processor 110. The flash translation layer 137 may provide a command having an address (e.g., a physical address) of the second storage area 131b to the nonvolatile memory device 131 depending on a request originating from the modem 120.

Figure 7:
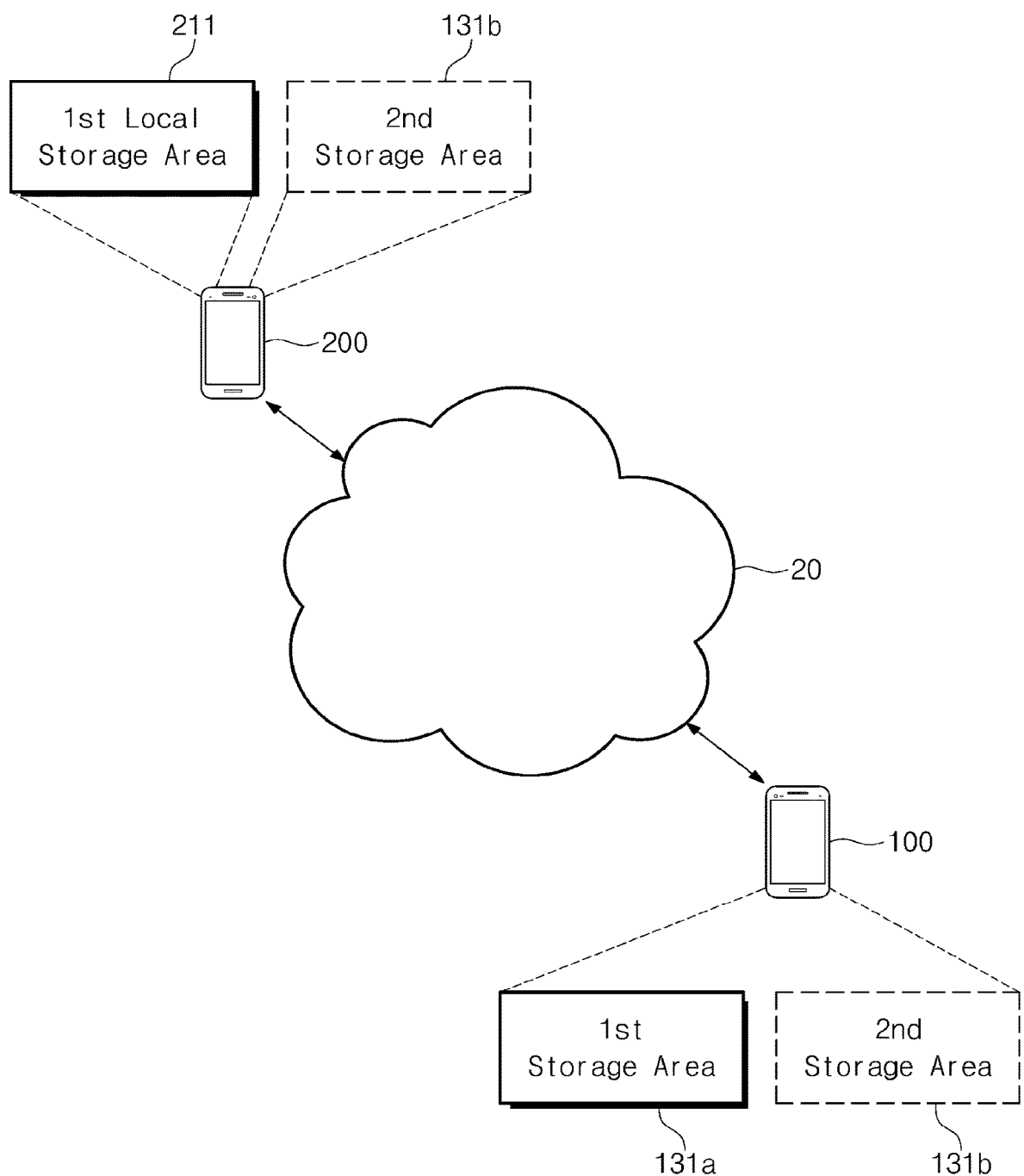
FIG. 7 is a conceptual diagram illustrating an example in which a computing device communicates with an external device over a network, according to an exemplary embodiment.

FIG. 7 is a conceptual diagram illustrating an example in which the computing device 100 communicates with an external device 200 over a network 20, according to an exemplary embodiment. Referring to FIGS. 2 and 7, the computing device 100 may include the first storage area 131a and the second storage area 131b. The computing device 100 may recognize the first storage area 131a as its own storage capacity. The computing device 100 may provide the second storage area 131b to the external device 200 over the network 20.

The external device 200 may include a first local storage area 211. The external device 200 may include a mobile device such as a smartphone, a smart pad, a smart watch, etc. The external device 200 may access the second storage area 131b of the computing device 100 over the network 20. For example, the external device 200 may access the second storage area 131b without passing through or increasing a load on the application processor 110 of the computing device 100.

In addition to the first local storage area 211, the external device 200 may further recognize the second storage area 131b of the computing device 100 as its own expansion capacity. Data that the external device 200 intends to write in the second storage area 131b may be transmitted to the computing device 100 over the network 20. Data that the external device 200 intends to read from the second storage area 131b may be transmitted from the computing device 100 over the network 20.

According to aspects of one or more exemplary embodiments, the external device 200 may access the second storage area 131b of the computing device 100 over the network 20 without consuming resources and power of the application processor 110 of the computing device 100. Accordingly, there is provided an improved network storage environment.

Figure 8:
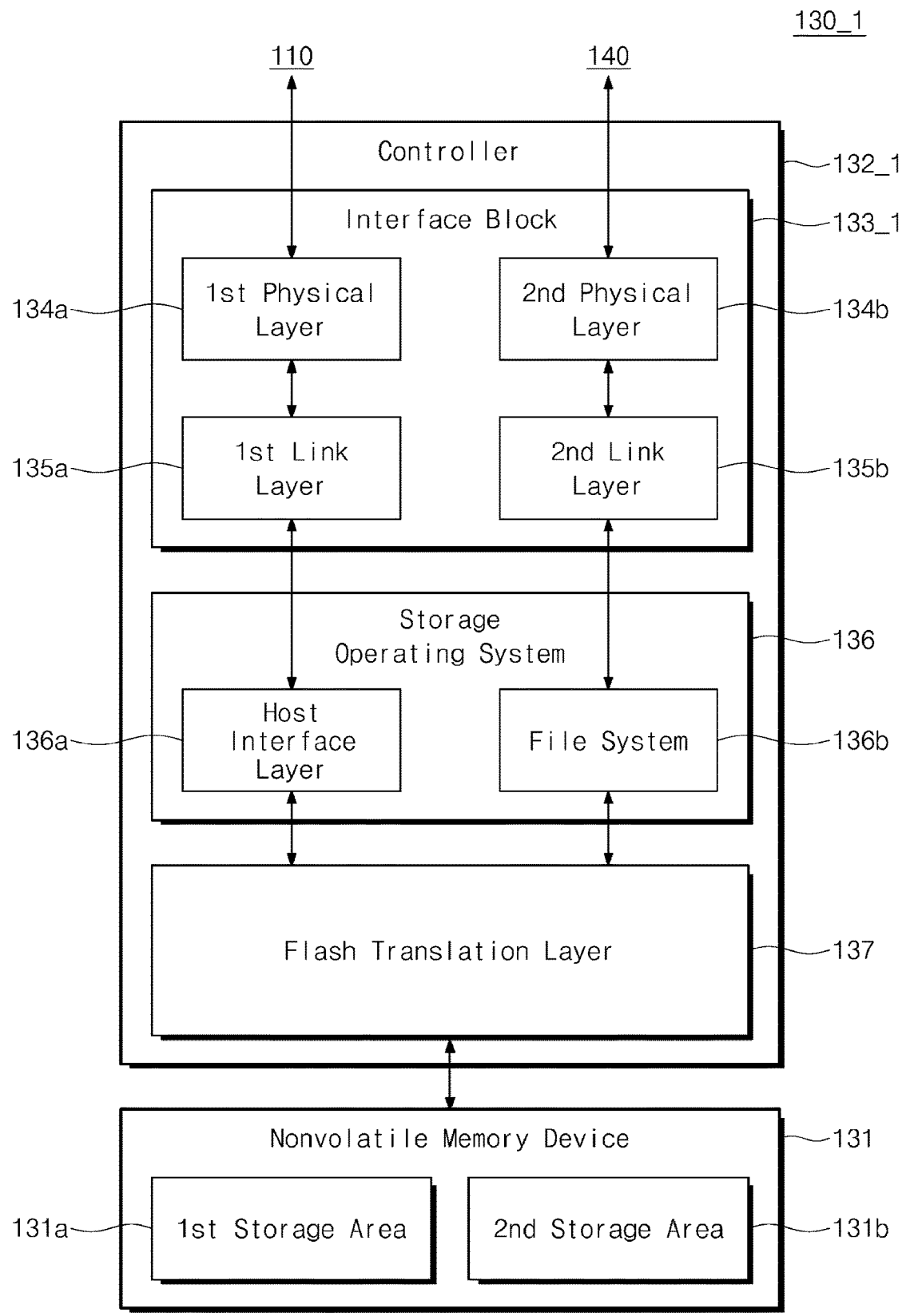
FIG. 8 is a block diagram illustrating an application of the storage device of FIG. 6, according to an exemplary embodiment.

FIG. 8 is a block diagram illustrating an application of the storage device 130 of FIG. 6, according to an exemplary embodiment. Referring to FIGS. 2 and 8, a storage device 130_1 includes the nonvolatile memory device 131 and a controller 132_1. A configuration and an operation of the nonvolatile memory device 131 are the same as or similar to those described with reference to FIG. 6, and thus, the same description as the nonvolatile memory device 131 of FIG. 6 will not be repeated here.

The controller 132_1 includes an interface block 133_1, the storage operating system 136, and the flash translation layer 137. Configurations and operations of the storage operating system 136 and the flash translation layer 137 are similar to those described with reference to FIG. 6, and thus, the same description as the storage operating system 136 and the flash translation layer 137 will not be repeated here.

The interface block 133_1 includes a first physical layer 134a, a second physical layer 134b, the first link layer 135a, and the second link layer 135b. As compared to the interface block 133 of FIG. 6, the physical layer 134 may be divided into the first and second physical layers 134a and 134b.

The first physical layer 134a may correspond to the first link layer 135a and may process a request (or data) provided from the application processor 110. Also, the first physical layer 134a may provide a request (or data) received from the first link layer 135a to the application processor 110.

The second physical layer 134b may correspond to the second link layer 135b and may process a request (or data) provided from the modem 120 through the switch 140. Also, the second physical layer 134b may provide a request (or data) received from the second link layer 135b to the modem 120 through the switch 140.

In an exemplary embodiment, the first physical layer 134a may be the same as the second physical layer 134b. Each of the physical layer 134a and the second physical layer 134b may include MIPI M-PHY. As another example, the first physical layer 134a may be different from the second physical layer 134b. For example, the first physical layer 134a may include a PCI or PCIe-based physical layer, and the second physical layer 134b may include MIPI M-PHY.

If the first physical layer 134a and the second physical layer 134b are provided separately, the storage device 130 may process a request (or data) provided from the modem 120 through the switch 140 and a request (or data) provided from the application processor 110 in parallel (or at the same time).

For example, the first physical layer 134a may communicate with the application processor 110 while the second physical layer 134b communicates with the modem 120 through the switch 140. The storage operating system 136 may give or assign priorities to a request originating from the modem 120 and a request originating from the application processor 110 and may process the requests according to the given priorities.

For example, the storage operating system 136 may set the priority of a request originating from the application processor 110 to be higher than the priority of a request originating from the modem 120. The storage operating system 136 may manage a request originating from the modem 120 and a request originating from the application processor 110 in the same queue or different queues.

Figure 9:
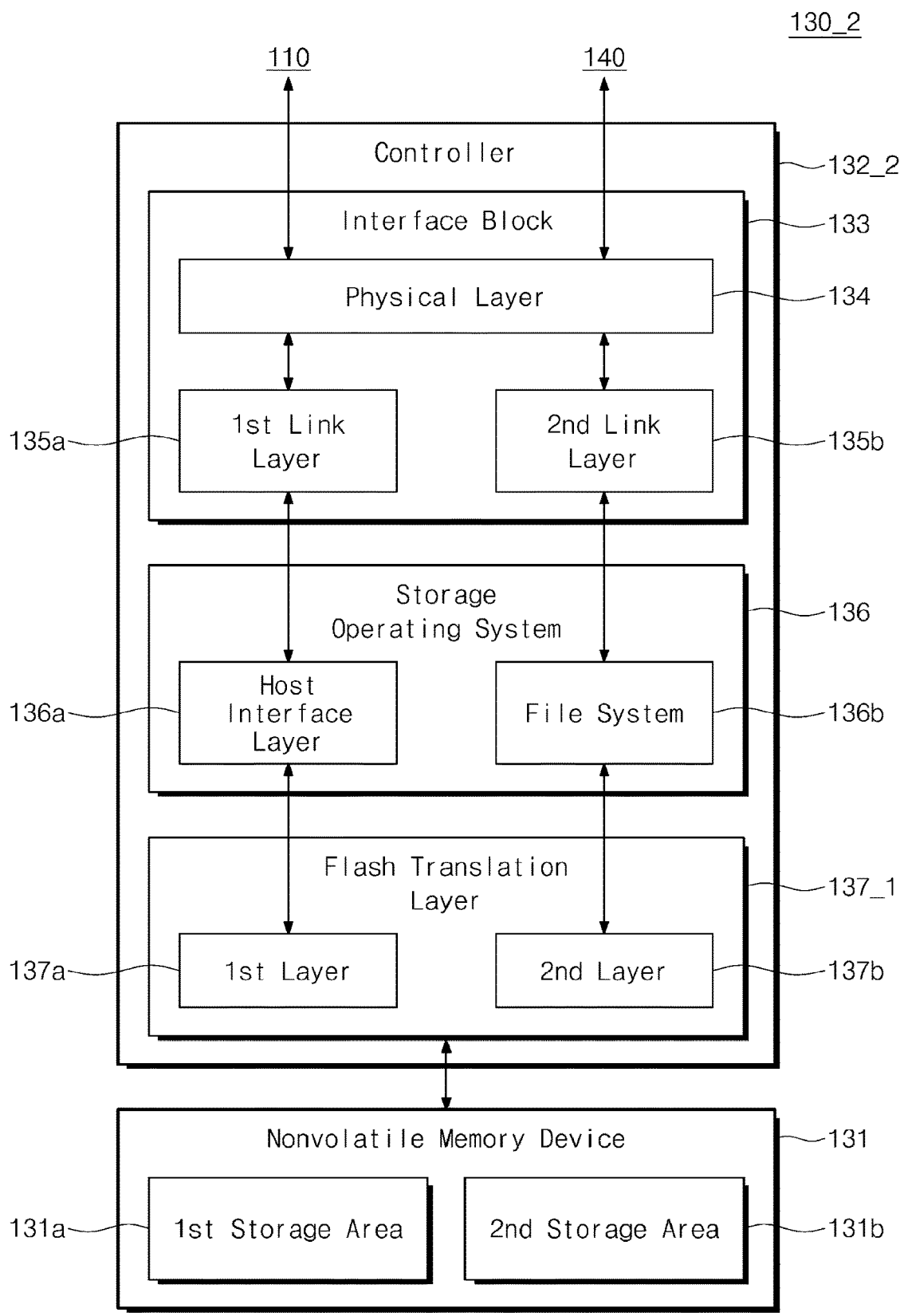
FIG. 9 is a block diagram illustrating another application of the storage device of FIG. 6, according to an exemplary embodiment.

FIG. 9 is a block diagram illustrating another application of the storage device 130 of FIG. 6, according to an exemplary embodiment. Referring to FIGS. 2 and 9, a storage device 130_2 includes the nonvolatile memory device 131 and a controller 132_2. A configuration and an operation of the nonvolatile memory device 131 are the same as or similar to those described with reference to FIG. 6, and thus, the same description as the nonvolatile memory device 131 of FIG. 6 will not be repeated here.

The controller 132_2 includes the interface block 133, the storage operating system 136, and a flash translation layer 137_1. Configurations and operations of the interface block 133 and the storage operating system 136 are similar to those described with reference to FIG. 6, and thus, the same description as the interface block 133 and the storage operating system 136 of FIG. 6 will not be repeated here.

As compared to the flash transition layer 137 of FIG. 6, the flash translation layer 137_1 may include a first layer 137a and a second layer 137b. The first layer 137a may correspond to the application processor 110 and may translate an address of a command originating from the application processor 110. The second layer 137b may correspond to the modem 120 and may translate an address of a command originating from the modem processor 120.

The first layer 137a and the second layer 137b may operate in parallel (or at the same time). For example, the second layer 137b may translate an address of a command originating from the modem 120 while the first layer 137a translates an address of a command originating from the application processor 110. Accordingly, an address translation speed of the flash translation layer 137_1 may be improved.

In an exemplary embodiment, as described above with reference to FIG. 8, the physical layer 134 may be divided into the first physical layer 134a and the second physical layer 134b. If the physical layer 134 is divided into the first physical layer 134a and the second physical layer 134b, the first physical layer 134a and the second physical layer 134b may process a request (or data) originating from the application processor 110 and a request (or data) originating from the modem 120 in parallel (or at the same time).

Figure 10:
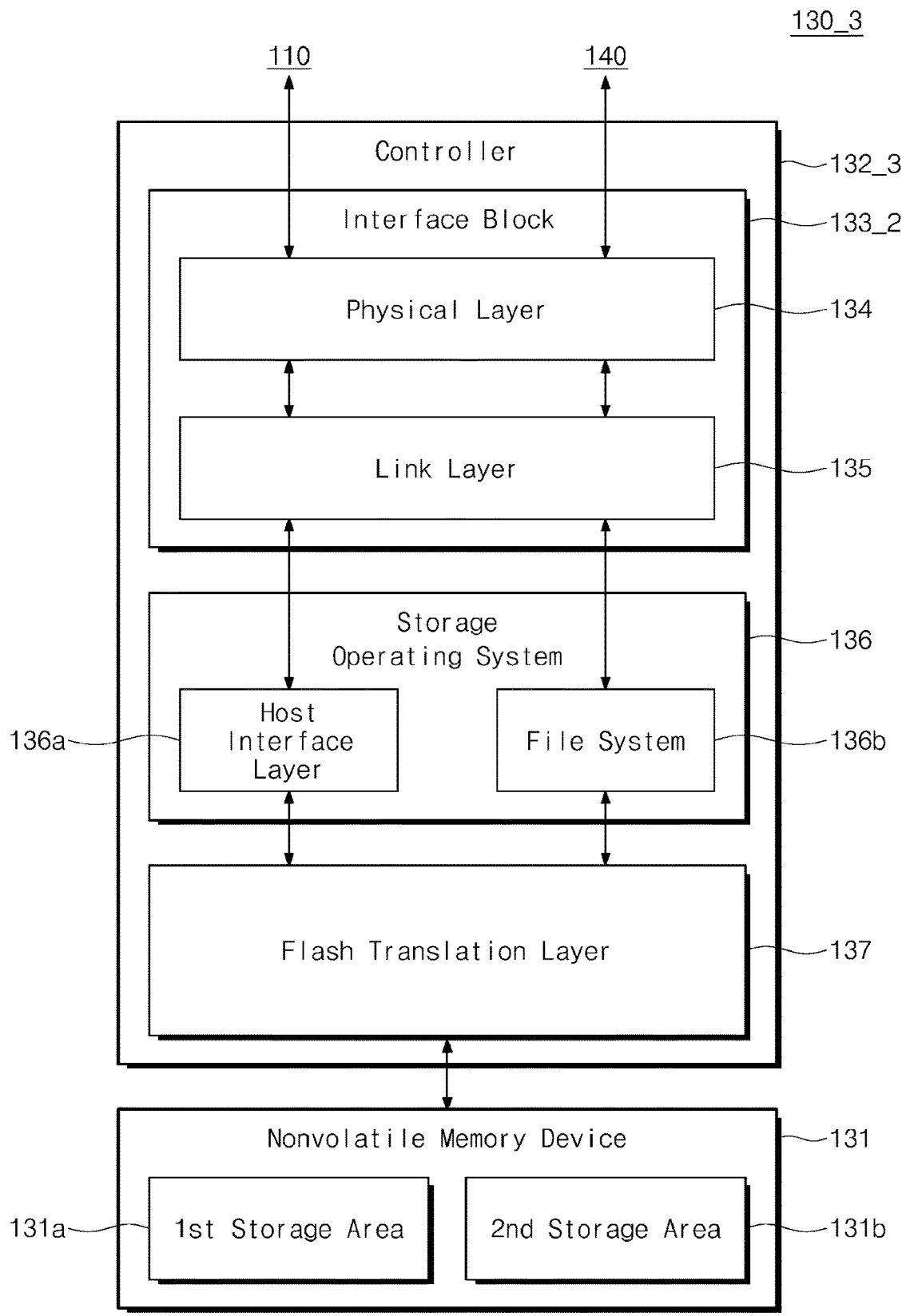
FIG. 10 is a block diagram illustrating another application of the storage device of FIG. 6, according to an exemplary embodiment.

FIG. 10 is a block diagram illustrating another application of the storage device 130 of FIG. 6, according to an exemplary embodiment. Referring to FIGS. 2 and 10, a storage device 130_3 includes the nonvolatile memory device 131 and a controller 132_3. A configuration and an operation of the nonvolatile memory device 131 are the same as or similar to those described with reference to FIG.

6, and thus, the same description as the nonvolatile memory device 131 of FIG. 6 will not be repeated here.

The controller 132_3 includes an interface block 133_2, the storage operating system 136, and the flash translation layer 137. Configurations and operations of the storage operating system 136 and the flash translation layer 137 are similar to those described with reference to FIG. 6, and thus, the same description as the storage operating system 136 and the flash translation layer 137 will not be repeated here.

As compared to the controller 132 of FIG. 6, the first and second link layers 135a and 135b may be integrated in a link layer 135. The link layer 135 may process a request (or data) originating from the application processor 110 and a request (or data) originating from the modem 120 in common. If one link layer 135 is used in common, resources and power consumed in the link layer 135 may be reduced.

In an exemplary embodiment, as in the description provided above with reference to FIGS. 5A and 5B, a request originating from the modem 120 and a request originating from the application processor 110 may have different addresses or different tags. Depending on the different addresses or the different tags, the storage operating system 136 may process the request originating from the application processor 110 by using the host interface layer 136a and may process the request originating from the modem 120 by using the file system 136b.

In an exemplary embodiment, as described with reference to FIG. 8, the physical layer 134 may be divided into the first physical layer 134a and the second physical layer 134b. If the physical layer 134 is divided into the first physical layer 134a and the second physical layer 134b, the first physical layer 134a and the second physical layer 134b may process a request (or data) originating from the application processor 110 and a request (or data) originating from the modem 120 in parallel (or at the same time).

In an exemplary embodiment, as described above with reference to FIG. 9, the flash translation layer 137_1 may include the first layer 137a and the second layer 137b. The first layer 137a may translate an address of a command originating from the application processor 110, and the second layer 137b may translate an address of a command originating from the modem 120. Accordingly, a speed to translate addresses may be improved.

Figure 11:
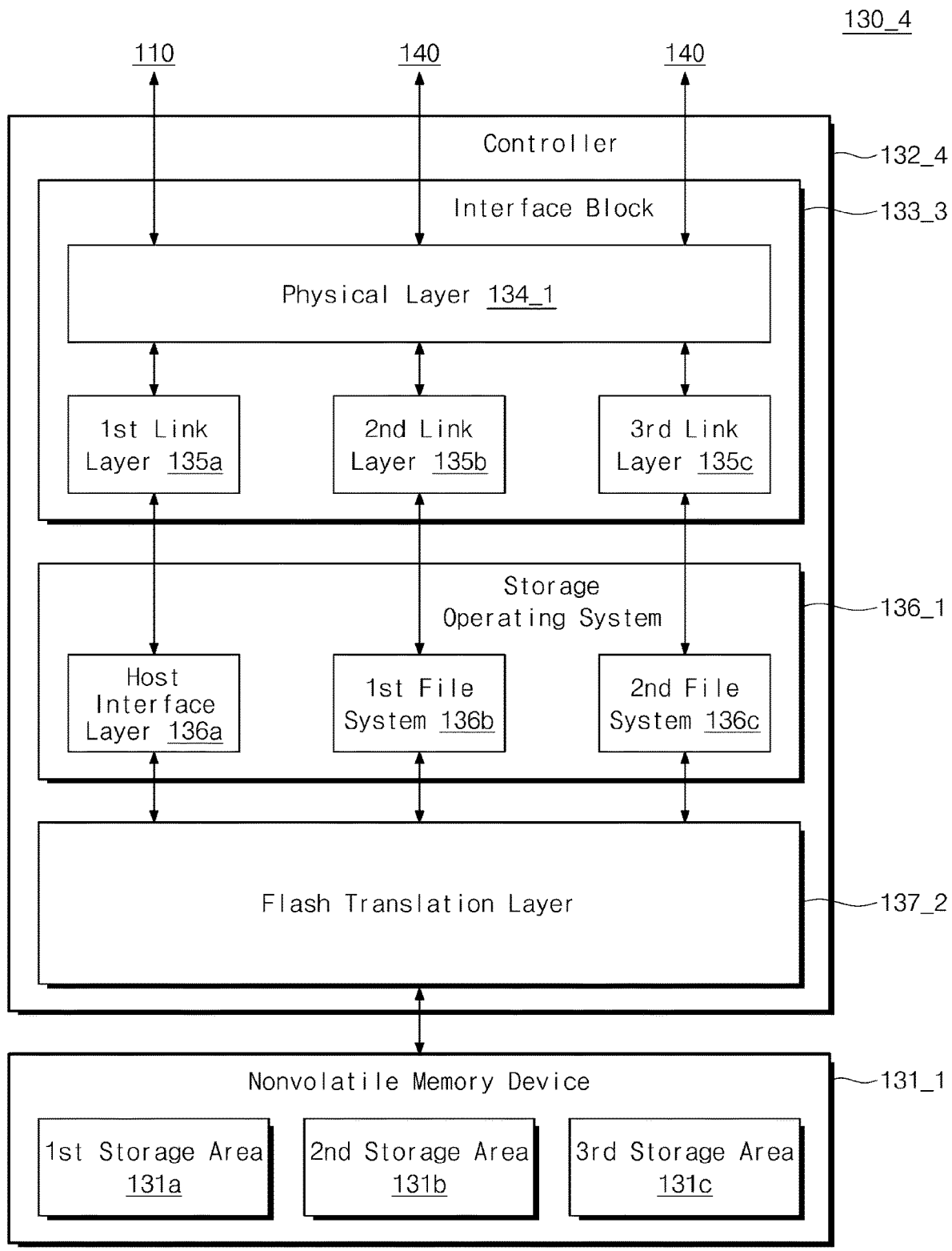
FIG. 11 is a block diagram illustrating another application of the storage device of FIG. 6, according to an exemplary embodiment.

FIG. 11 is a block diagram illustrating another application of the storage device 130 of FIG. 6, according to an exemplary embodiment. Referring to FIGS. 2 and 11, a storage device 130_4 includes a nonvolatile memory device 131_1 and a controller 132_4. As compared to the nonvolatile memory device 131 of FIG. 6, the nonvolatile memory device 131_1 further includes a third storage area 131c.

The third storage area 131c may be allocated to the modem 120. Data to be written in the storage device 130 through the switch 140 from the modem 120 may be stored in the second storage area 131b or the third storage area 131c. Data stored in the second storage area 131b or the third storage area 131c may be transmitted to an external device through the switch 140 and the modem 120.

The controller 132_4 includes an interface block 133_3, a storage operating system 136_1, and a flash translation layer 137_2. The interface block 133_3 may include a physical layer 134_1 and first to third link layers 135a to 135c. The physical layer 134_1 may be used in common with respect to the application processor 110 and the modem 120.

The physical layer 134_1 may provide a request (or data) originating from the application processor 110 to the first link layer 135a. Also, the physical layer 134_1 may provide a request (or data) received from the first link layer 135a to the application processor 110.

The physical layer 134_1 may provide a request (or data) originating from the modem 120 to one of the second and third link layers 135b and 135c. The physical layer 134_1 may provide a request (or data) provided from the second or third link layer 135b or 135c to the modem 120 through the switch 140.

In an exemplary embodiment, as described above with reference to FIG. 5A, a request targeting the application processor 110, a request targeting the second storage area 131b, and a request targeting the third storage area 131c may have different addresses. The physical layer 134_1 may provide a request to one of the first to third link layers 135a to 135c depending on the different addresses.

According to another exemplary embodiment, as described above with reference to FIG. 5B, a request targeting the application processor 110, a request targeting the second storage area 131b, and a request targeting the third storage area 131c may have the same address and may have different tags. The physical layer 134_1 may provide a request to one of the first to third link layers 135a to 135c depending on the different tags.

The host interface layer 136a may process a request (or data) provided through the first link layer 135a. The host interface layer 136a may provide a request (or data) generated by the storage operating system 136_1 to the first link layer 135a. The host interface layer 136a may process a request associated with the application processor 110.

A first file system 136b may be used to manage the second storage area 131b. A second file system 136c may be used to manage the third storage area 131c. The storage operating system 136_1 may provide a command for accessing the first storage area 131a to the flash translation layer 137_2 based on the host interface layer 136a.

The first file system 136b may allocate addresses (e.g., logical addresses) to the second storage area 131b and may be used to manage the second storage area 131b. The storage operating system 136_1 may provide a command for accessing the second storage area 131b to the flash translation layer 137_2 based on the first file system 136b.

The second file system 136c may allocate addresses (e.g., logical addresses) to the third storage area 131c and may be used to manage the third storage area 131c. The storage operating system 136_1 may provide a command for accessing the third storage area 131c to the flash translation layer 137_2 based on the second file system 136c.

The flash translation layer 137_2 may translate a command provided from the storage operating system 136_1 to a command suitable for the nonvolatile memory device 131_1. For example, the flash translation layer 137_2 may translate an address (e.g., a logical address) of a received command to an address (e.g., a physical address) of the nonvolatile memory device 131_1.

As described above with reference to FIG. 11, the storage device 130_4 may further include the third storage area 131c accessible over a network independently of the second storage area 131b. The number of storage areas of the storage device 130_4, which are accessible over a network, is not limited, and may be more than three in one or more other exemplary embodiments.

In an exemplary embodiment, as in the description provided above with reference to FIG. 8, the physical layer 134 may be divided into three physical layers corresponding to the first to third storage areas 131a to 131c, respectively. In an exemplary embodiment, as in the description given with reference to FIG. 9, the flash translation layer 137_2 may be divided into three layers corresponding to the first to third storage areas 131a to 131c, respectively.

In an exemplary embodiment, as in the description given with reference to FIG. 10, the first to third link layers 135a to 135c may be integrated in one link layer. The one link layer may be used in common with respect to the application processor 110 and the modem 120. In other words, the one link layer may be used in common with respect to the first to third storage areas 131a to 131c.

Figure 12:
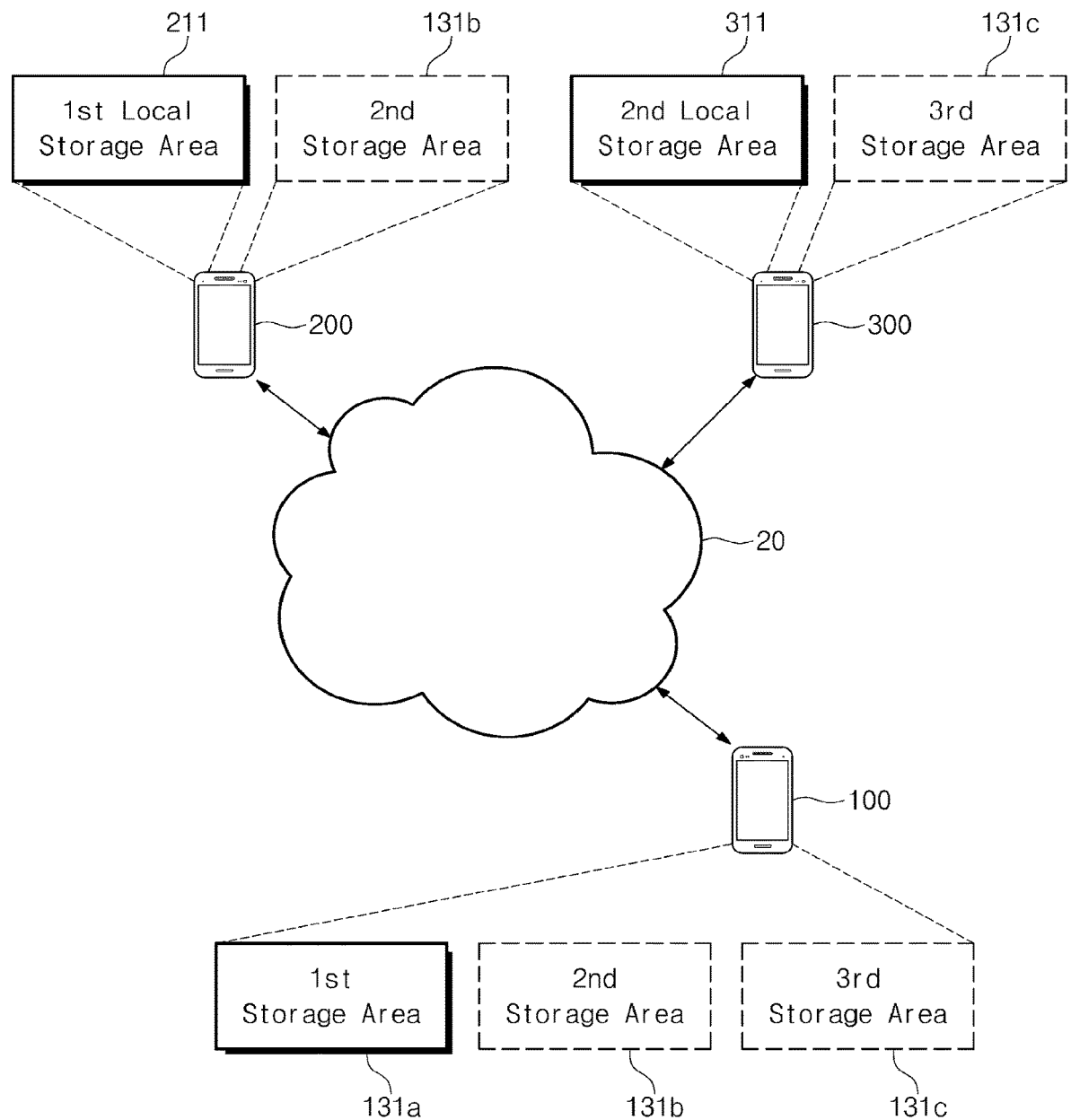
FIG. 12 is a conceptual diagram illustrating an example in which a computing device communicates with external devices over a network, according to an exemplary embodiment.

FIG. 12 is a conceptual diagram illustrating an example in which the computing device 100 communicates with first and second external devices 200 and 300 over a network 20, according to an exemplary embodiment. Referring to FIGS. 2, 11, and 12, the computing device 100 may include the first storage area 131a to the third storage area 131c. The computing device 100 may recognize the first storage area 131 as its own storage capacity. The computing device 100 may provide the second and third storage areas 131b and 131c respectively to the first and second external devices 200 and 300 over the network 20.

The first external device 200 may include the first local storage area 211. The first external device 200 may access the second storage area 131b of the computing device 100 over the network 20. For example, the first external device 200 may access the second storage area 131b without passing through the application processor 110 of the computing device 100.

In addition to the first local storage area 211, the first external device 200 may further recognize the second storage area 131b of the computing device 100 as its own expansion capacity. Data that the first external device 200 intends to write in the second storage area 131b may be transmitted to the computing device 100 over the network 20. Data that the first external device 200 intends to read from the second storage area 131b may be transmitted from the computing device 100 over the network 20.

The second external device 300 may include a second local storage area 311. The second external device 300 may access the third storage area 131c of the computing device 100 over the network 20. For example, the second external device 300 may access the third storage area 131c without passing through the application processor 110 of the computing device 100.

In addition to the second local storage area 311, the second external device 300 may further recognize the third storage area 131c of the computing device 100 as its own expansion capacity. Data that the second external device 300 intends to write in the third storage area 131c may be transmitted to the computing device 100 over the network 20. Data that the second external device 300 intends to read from the third storage area 131c may be transmitted from the computing device 100 over the network 20.

In the exemplary embodiment of FIG. 12, the first and second external devices 200 and 300 access the different second and third storage areas 131b and 131c, respectively. However, it is understood that one or more other exemplary embodiments are not limited thereto. For example, according to another exemplary embodiment, one of the first and second external devices 200 and 300 may access all of the second and third storage areas 131b and 131c of the computing device 100.

Figure 13:
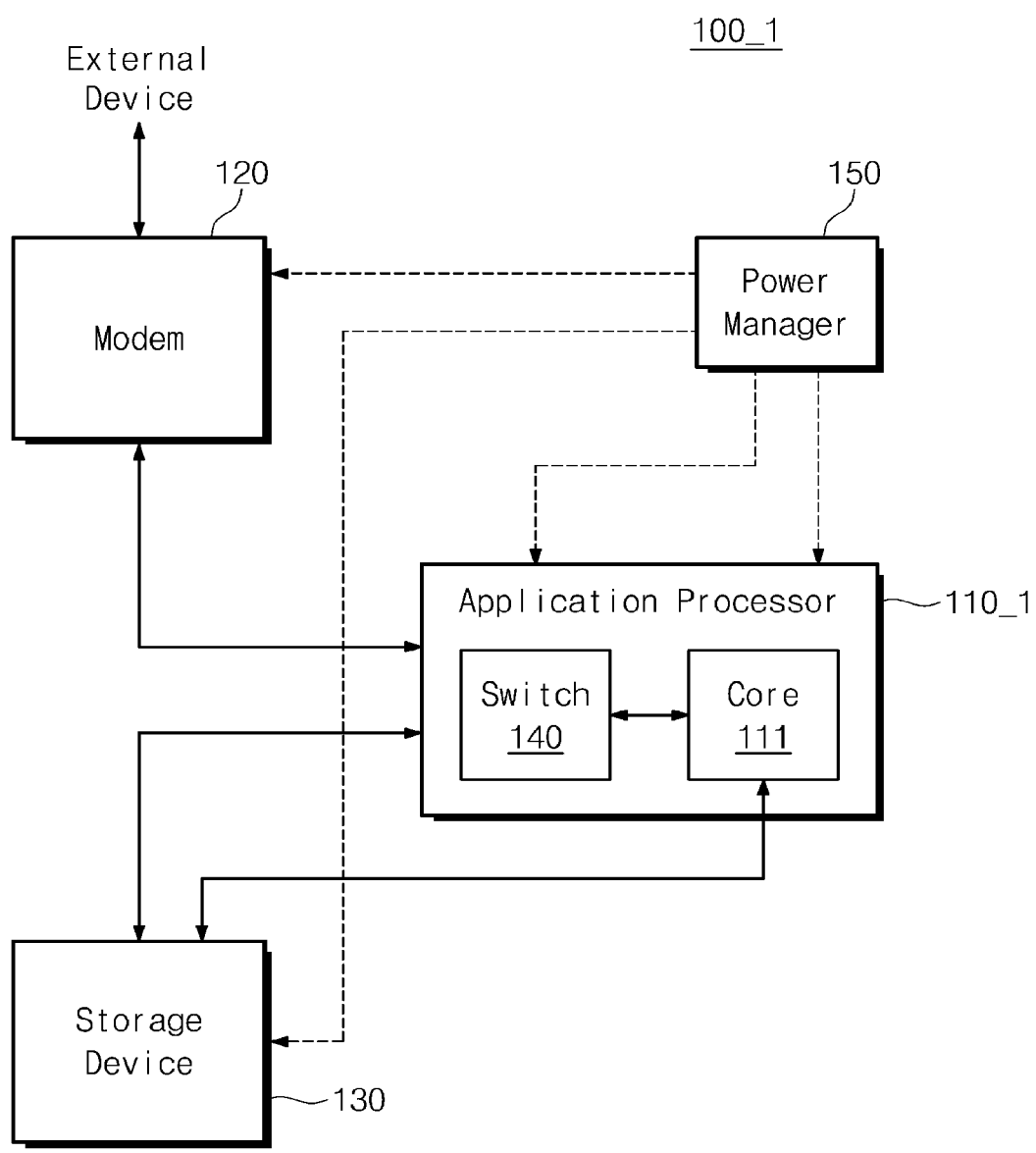
FIG. 13 is a block diagram illustrating an application of the computing device of FIG. 2, according to an exemplary embodiment.

FIG. 13 is a block diagram illustrating an application of the computing device 100 of FIG. 2, according to an exemplary embodiment. Referring to FIG. 13, a computing device 100_1 includes an application processor 110_1, the modem 120, the storage device 130, and the power manager 150. As compared to FIG. 2, the switch 140 may be implemented within the application processor 110_1.

The switch 140 may provide a request (or data) received from the modem 120 to a core 111 of the application processor 110 or the storage device 130. The switch 140 may provide a request (or data) received from the core 111 to the modem 120. The switch 140 may provide a request (or data) received from the storage device 130 to the modem 120.

The core 111 may communicate with the modem 120 through the switch 140 and may directly access the storage device 130 without passing through the switch 140. The power manager 150 may supply power or manage a power supply to the core 111, the switch 140, the modem 120, and the storage device 130. As described above with reference to FIG. 2, power domains may be constructed or implemented such that the switch 140 and the core 111 belong to different power domains.

The power domains of the computing device 100_1 may be constructed or implemented in a same or similar manner as described above with reference to FIG. 2 except that the above description of the application processor 110 is applicable to the core 111, and thus, a duplicated description will not be repeated here.

Figure 14:
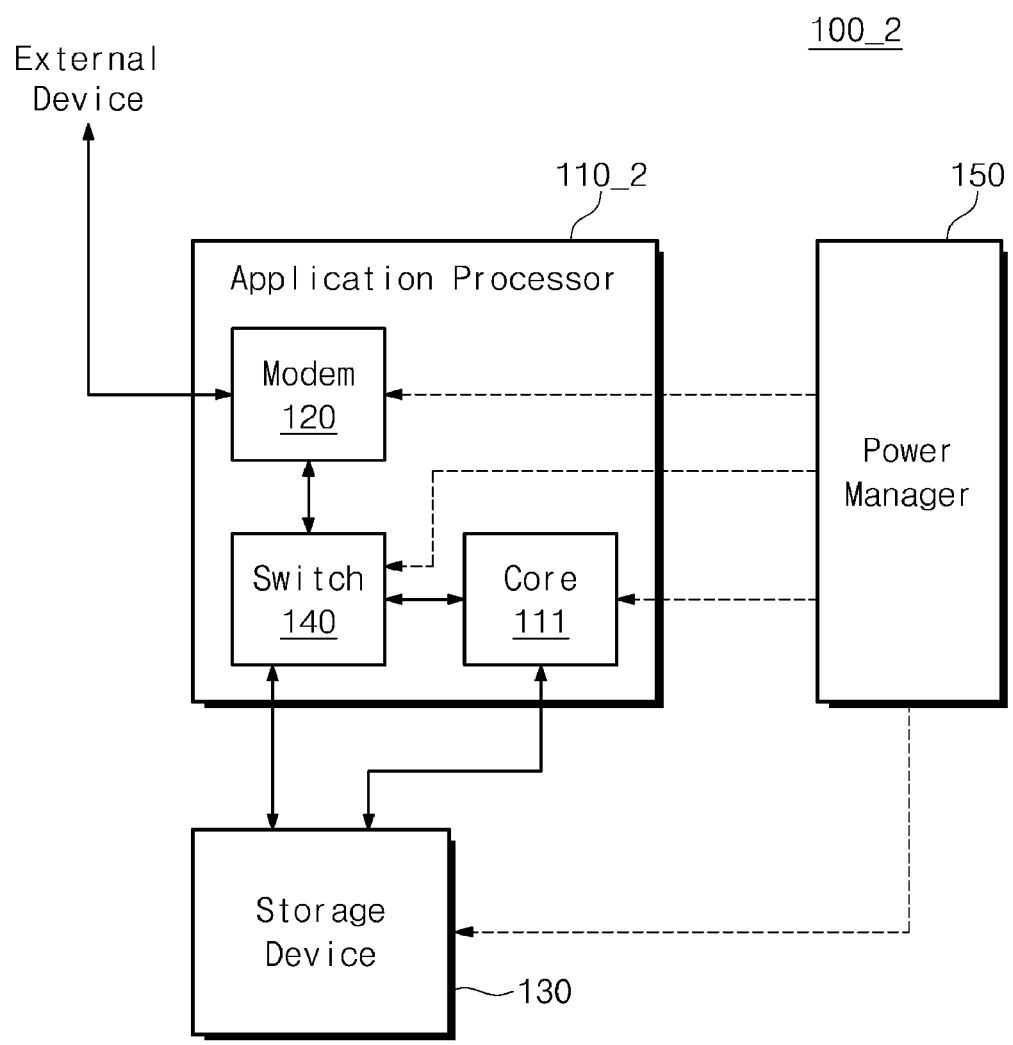
FIG. 14 is a block diagram illustrating another application of the computing device of FIG. 2, according to an exemplary embodiment.

FIG. 14 is a block diagram illustrating another application of the computing device 100 of FIG. 2, according to an exemplary embodiment. Referring to FIG. 14, the computing device 100_2 includes an application processor 110_2, the storage device 130, and the power manager 150. As compared to FIG. 2, the switch 140 and the modem 120 may be implemented within the application processor 110_2.

The power domains of the computing device 100_2 may be constructed or implemented in a same or similar manner as described above with reference to FIG. 2 except that the above description of the application processor 110 is applicable to the core 111, and thus, a duplicated description will not be repeated here.

Figure 15:
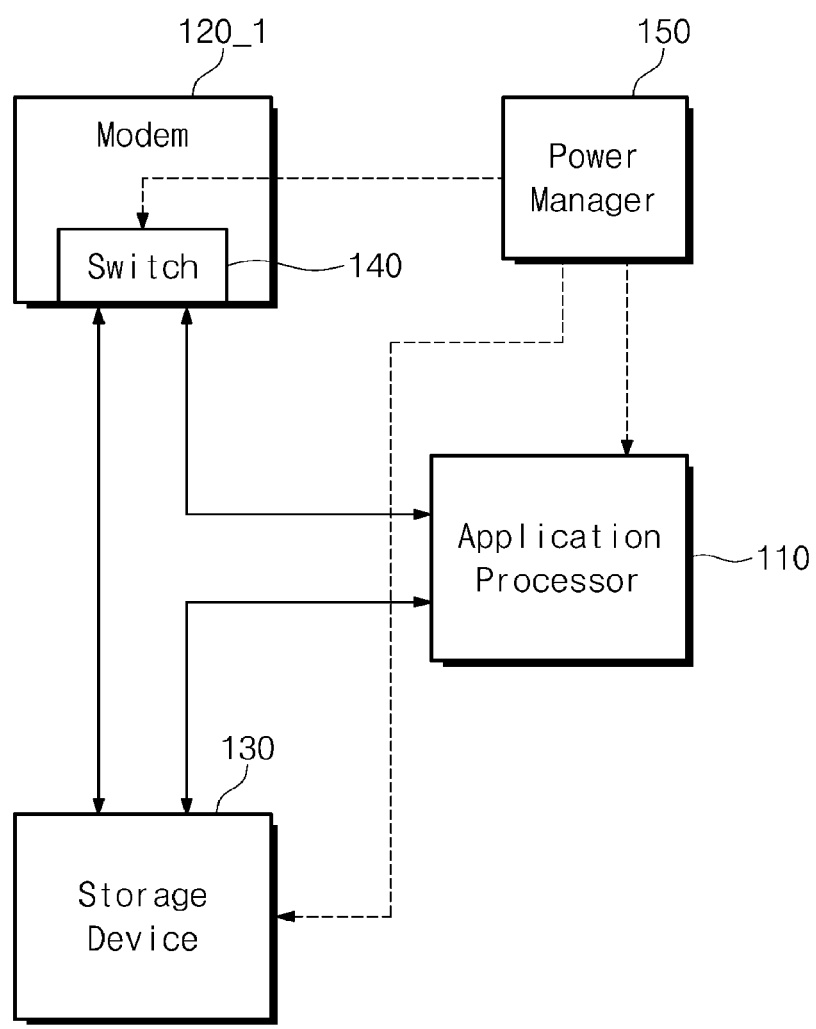
FIG. 15 is a block diagram illustrating another application of the computing device of FIG. 2, according to an exemplary embodiment.

FIG. 15 is a block diagram illustrating another application of the computing device 100 of FIG. 2, according to an exemplary embodiment. Referring to FIG. 15, the computing device 100_3 includes the application processor 110, a modem 120_1, the storage device 130, and the power manager 150. As compared to FIG. 2, the switch 140 may be implemented within the modem 120_1.

The power domains of the computing device 100_3 may be constructed or implemented in a same or similar manner as described above with reference to FIG. 2, and thus, a duplicated description will not be repeated here.

According to aspects of one or more exemplary embodiments, data may be transmitted and received over a network without passing through a processor. Accordingly, since occupation of or load on the processor due to communication over the network is prevented or reduced, there are provided a computing device, a storage device, and an operation method of the computing device, capable of reducing resources or costs needed for the communication over the network.

One or more of the above-described exemplary embodiments can be implemented in the form of program instructions that can be executed through various computer components and recorded on a computer-readable recording medium. The computer-readable recording medium may include program instructions, data files, data structures, or a combination thereof. The program instructions recorded on the computer-readable recording medium may be program instructions specially designed and configured for the present disclosure or program instructions known to and usable by one of ordinary skill in the art of computer software.

Examples of the computer-readable recording medium include magnetic media (e.g., a hard disk, a floppy disk, and a magnetic tape), optical media (e.g., a CD-ROM and a DVD), magneto-optical media (e.g., a floptical disk), and hardware devices specially configured to store and execute program instructions (e.g., a ROM, a RAM, and a flash memory). Examples of the program instructions include machine code generated by a compiler and high-level language code that can be executed by a computer using an interpreter or the like.

It should be understood that exemplary embodiments described herein should be considered in a descriptive sense only and not for purposes of limitation. For example, a single element in the above description may be divided into a plurality of elements, and a plurality of elements in the above description may be combined into a single element. Descriptions of features or aspects within each exemplary embodiment should typically be considered as available for other similar features or aspects in other exemplary embodiments.

While exemplary embodiments have been described with reference to the drawings, it will be apparent to those skilled in the art that various changes and modifications may be made without departing from the spirit and scope of the inventive concept. Therefore, it should be understood that the above exemplary embodiments are not limiting, but illustrative.

What is claimed is:

1. A computing device comprising:
    a nonvolatile memory comprising a first storage area and a second storage area; and
    a controller configured to receive a first request and a second request from a first external device and a second external device, respectively, to access the first storage area based on the first request, and to access the second storage area based on the second request,
    wherein the controller comprises:
        a file system configured to manage the second storage area based on the second request, and
        a flash translation layer configured to translate the second request to a command associated with the second storage area by using the file system,
    wherein the controller further comprises:
        a first link layer associated with the first external device and the first storage area; and
        a second link layer associated with the second external device and the second storage area, and
    wherein the first link layer is different from the second link layer.

2. A computing device comprising:
    a nonvolatile memory comprising a first storage area and a second storage area; and
    a controller configured to receive a first request and a second request from a first external device and a second external device, respectively, to access the first storage area based on the first request, and to access the second storage area based on the second request,
    wherein the controller comprises:
        a file system configured to manage the second storage area based on the second request, and
        a flash translation layer configured to translate the second request to a command associated with the second storage area by using the file system,
    wherein the controller further comprises:
        a first physical layer associated with the first external device and the first storage area; and
        a second physical layer associated with the second external device and the second storage area, and
    wherein the first physical layer is different from the second physical layer.

3. The computing device of claim 1, wherein the flash translation layer is configured to translate the first request to a second command associated with the first storage area.

4. The computing device of claim 1, wherein the controller further comprises:
    a second flash translation layer configured to translate the first request to a second command associated with the first storage area.

5. A computing device comprising:
    a nonvolatile memory comprising a first storage area and a second storage area; and
    a controller configured to receive a first request and a second request from a first external device and a second external device, respectively, to access the first storage area based on the first request, and to access the second storage area based on the second request,
    wherein the controller comprises:
        a file system configured to manage the second storage area based on the second request, and
        a flash translation layer configured to translate the second request to a command associated with the second storage area by using the file system, and
    wherein the controller is configured to adjust a ratio of the first storage area and the second storage area based on a request from an application processor.

6. The computing device of claim 2, wherein the controller further comprises:
    a first link layer associated with the first external device and the first storage area; and
    a second link layer associated with the second external device and the second storage area, and
    wherein the first link layer is different from the second link layer.

7. The computing device of claim 5, wherein the controller further comprises:
    a first link layer associated with the first external device and the first storage area; and
    a second link layer associated with the second external device and the second storage area, and
    wherein the first link layer is different from the second link layer.

8. The computing device of claim 5, wherein the controller further comprises:
    a first physical layer associated with the first external device and the first storage area; and
    a second physical layer associated with the second external device and the second storage area, and
    wherein the first physical layer is different from the second physical layer.

9. The computing device of claim 2, wherein the flash translation layer is configured to translate the first request to a second command associated with the first storage area.

10. The computing device of claim 2, wherein the controller further comprises:
    a second flash translation layer configured to translate the first request to a second command associated with the first storage area.

11. The computing device of claim 5, wherein the flash translation layer is configured to translate the first request to a second command associated with the first storage area.

12. The computing device of claim 5, wherein the controller further comprises:

a second flash translation layer configured to translate the first request to a second command associated with the first storage area.

13. The computing device of claim 1, wherein the controller further comprises:
a physical layer associated with the first external device and the second external deice, and associated with the first link layer and the second link layer.

14. The computing device of claim 1, wherein the controller further comprises:
a second flash translation layer configured to translate the first request to a second command associated with the first storage area.

15. The computing device of claim 1, wherein the flash translation layer is further configured to translate the first request to a second command associated with the first storage area.

16. The computing device of claim 1, wherein the non-volatile memory further comprises a third storage area,
the controller is further configured to receive a third request from a third external device and access the third storage area based on the third request, and
the controller further comprises a second file system configured to manage the third storage area based on the third request.

17. The computing device of claim 16, wherein the controller further comprises a third link layer associated with the third storage area.

18. The computing device of claim 1, further comprising:
a modem configured to communicate with remote devices, the modem being one of the first external device and the second external device; and
a processor configured to manage the computing device, the processor being another one of the first external device and the second external device.

19. The computing device of claim 1, further comprising:
a modem configured to receive the first request and the second request from the first external device and the second external device respectively, and transfer the first request and the second request to the controller.

* * * * *